2,962,446

SILICON HYDRAULIC FLUIDS CONTAINING BORON ESTERS

James F. Cook, Garden Grove, Calif., assignor to Union Oil Company of California, Los Angeles, Calif., a corporation of California No Drawing. Filed Feb. 24, 1956, Ser. No. 567,485

6 Claims. (Cl. 252—78)

This invention relates to a new class of boron compounds of the ester type having particular utility in hydraulic fluids of the silicone, alkyl silicate and polysilicate types. More specifically, the invention relates to silicone and silicate hydraulic fluids stabilized to prevent decomposition of said fluids by the addition of certain borate esters.

Dialkyl polysiloxanes and related silicone fluids which polysiloxanes have the general formula:

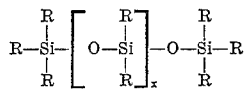

where R is an alkyl radical with from 1 to 4 carbon atoms and $x$ is 100 to 2000; alkyl silicates having the general formula:

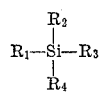

in which $R_1$, $R_2$, $R_3$ and $R_4$ are alkyl radicals with from 1 to 20 carbon atoms; and polymeric alkyl silicates, the structure of which is not known are used extensively in industrial applications, particularly as hydraulic fluids. The particular advantage of these silicon compounds is that they are fluids having an extremely high viscosity index (V.I.) that is, the change in viscosity with change in temperature is very small. This feature is important in many applications and is particularly important when the hydraulic fluid is to be used in aircraft where extremes of temperature are encountered. The V.I.'s of these various silicon fluids vary from about 125 to about 160. Of the silicon type fluids the dimethyl polysiloxanes, such as those having viscosities in the range of 300–400 centistokes at 25° C. are outstanding fluids for use in hydraulic systems.

Although the silicon compounds described are relatively stable against oxidation, oxidation does occur to some extent and once it starts, deterioration by hydrolysis, due to water formed by oxidation, becomes very rapid. When this occurs insoluble silicon compounds, as for example silicic acid and mixtures of resinous products, are formed which are highly objectionable in the hydraulic fluid systems.

It is found that if small amounts of certain borate esters are added to the described silicon fluids, the fluids are stabilized against deterioration of the type described. Possibly the effect of the borate esters is to react with any water produced by oxidation of the silicon compounds and thus remove water as such from the system to an extent sufficient to prevent hydrolysis of the silicon compounds. The borate esters employed are apparently more readily hydrolyzed than the silicon compounds and the intermediate hydrolysis products of the borate esters are soluble in the liquid silicon compounds and thus do not produce any objectionable effects. While it is believed that the effect of the boron esters is as described, it is not essential to the invention that this is actually the mechanism involved in preventing deterioration of the silicon compounds. Regardless of how the stabilization is effected it is found that the boron esters do protect the silicon compounds and prevent the formation of insoluble materials over long periods of use and/or exposure to oxidizing conditions. Moreover, it is observed that the lubricating characteristics of silicon-type hydraulic fluids are improved upon addition of the boron esters of this invention.

It is thus an object of this invention to provide boron esters of the type described herein which are found to stabilize silicone, silicate and polysilicate type fluids against deterioration. It is a further object of this invention to provide silicone, silicate and polysilicate fluids containing boron esters, which fluids are stabilized against deterioration, and exhibit improved lubrication characteristics.

It is found that by reacting, under dehydrating conditions, a particular class of dihydroxy organic compounds with boric acid or boron oxide using one-half mol of boron oxide or one mol of boric acid per mol of dihydroxy compound, there is produced a boron compound which when added to silicon fluids of the types described stabilizes the fluids and improves the lubricating characteristics of the fluid. The effectiveness of the boron compound in these respects is improved if the initial reaction product described is further reacted, under dehydrating conditions, with a monohydroxy organic compound such as a monohydroxy alcohol or a phenol in the ratio of one mol of the initial reaction product per mol of monohydroxy compound. As used herein the term boric acid is used in its usual sense to mean the compound $H_3BO_3$ and boron oxide is $B_2O_3$ which is also called boric anhydride.

Both of the boron compounds, i.e., the one obtained by reacting a dihydroxy compound with boric acid or boron oxide in the ratios described and the one obtained by further reacting the first product with a monohydroxy alcohol, are liquid to solid products at ordinary temperatures depending upon the dihydroxy and/or the monohydroxy compound employed. The products are completely soluble in the silicon hydraulic fluids described and in fact are soluble in mineral lubricating oils. When dissolved in lubricating oils and the like these boron esters are found to greatly improve the load carrying ability and the antiwear characteristics of the oil.

The initial reaction between the boric acid or boron oxide and the dihydroxy compound takes place readily under dehydrating conditions, thus the reaction occurs in the presence of dehydrating agents as for example concentrated sulfuric acid, concentrated phosphoric acid, $P_2O_5$, or the like. By concentrated is meant 40% to 100% or more, e.g., fuming acid. The reaction also takes place readily by refluxing the mixture of reactants with an entraining agent boiling at a temperature between about 180° F. and about 400° F., using a water trap in the reflux line. Entraining agents which are suitable include naphtha, benzene, toluene, chlorinated solvents, such as ethylene dichloride. In still another method, the reaction may be effected by carrying it out at reduced pressures sufficient to remove water produced in the reaction at the temperature at which the reaction takes place. Apparently catalysts are not essential.

Dihydroxy organic compounds, preferably dihydroxy hydrocarbon compounds, which may be used in the above reaction include those dihydroxy compounds in which the hydroxyl groups are attached to carbon atoms separated by at least one carbon atom and not more than two carbon atoms. Preferably, the two hydroxyl groups are attached to carbon atoms separated by one carbon atom. Dihydroxy alcohols which may be employed may be alkyl, cycloalkyl, or aryl alcohols. Preferably open chain alkyl dihydroxy alcohols are employed. In order to obtain boron derivatives which are most effective for the purposes indicated, it is desirable that the dihydroxy alcohol contain at least 6 carbon atoms per molecule, and it is found that such compounds having more than about 30 carbon atoms per molecule are not as active in inhibiting the decomposition of the silicon fluids. Preferably, the carbon atom content of the dihydroxy alcohols will be between 6 and about 18 and those having from 6 to 10 carbon atoms per molecule are particularly preferred. In addition to the alcohols described, the dihydroxy aromatic compounds represented by resorcinol and the various hydrocarbon substituted resorcinols may be employed. The carbon atom content limitations for the dihydroxy alcohols applies as well to the dihydroxy aromatic compounds.

Typical dihydroxy alcohols which may be used in the first reaction described to produce the first or intermediate boron derivative include 2,2-diethyl propanediol-1,3, 2,3-dimethyl butanediol-2,4, 2-methyl pentanediol-1,3, 2-methyl pentanediol-2,4, 2-ethylhexanediol-1,3, 2-ethyl-2-butyl propanediol-1,3, 2-ethyl-2-butyl butanediol-1,3, 4-ethyl decanediol-2,4, octadecanediol-1,3, 2-cyclohexyl propanediol-1,3, 2-benzyl propanediol-1,3. Typical dihydroxy aromatic compounds which may be used in addition to resorcinol include 4-butyl resorcinol, 2,4-dimethyl resorcinol, 2,5-dimethyl resorcinol, 4-isoamyl resorcinol and the like.

The initial product obtained by reacting boric acid or boron oxide with the dihydroxy compound, although having the desirable properties described hereinabove, is improved with respect to its ability to stabilize the silicon fluids and impart lubricating characteristics to such fluids by further reaction with a monohydroxy organic compound having from 1 to about 26 carbon atoms per molecule. The monohydroxy compound may be an alkyl, cycloalkyl, or aryl alcohol, or it may be a phenol or alkyl-substituted phenol. The aliphatic alcohols having from 1 to 20 carbon atoms per molecule are the preferred monohydroxy organic compounds. Thus methyl, ethyl, propyl, butyl, pentyl, hexyl, octyl, lauryl and stearyl alcohols are representative of the alcohols which may be used. Additionally, however, cyclohexyl, cyclopentyl and the various alkyl-substituted cyclohexyl and cyclopentyl alcohols may be employed. Moreover, phenol and the various alkyl-substituted phenols such as cresols and higher homologs may be employed. Alcohols such as furfuryl and tetrahydro furfuryl alcohols are also useful in preparing the final ester compound.

The structure of the boron derivatives obtained, as described above, is not definitely known. It is believed, however, that when one mol of a dihydroxy compound of the type described is reacted with one mol of boric acid, the product is a boron ester, in which one free —OH group remains attached to the boron atom. That esterification takes place with the hydroxyl groups of the dihydroxy compound is indicated by the fact that approximately 2 mols of water are released in this initial reaction. It is believed that a similar result is obtained when $B_2O_3$ is employed in place of the boric acid, since the products appear to have the same characteristics. In this case 1 mol of water is liberated per mol of dihydroxy compound. Since the reaction products cannot be defined by formula, they will be described herein as reaction products obtained by reacting one mol of dihydroxy alcohol with one mol of boric acid or one-half mol of $B_2O_3$ under dehydrating conditions. In order to distinguish the initial reaction product from the reaction product obtained by further esterification of the initial reaction product with a monohydroxy organic compound, the first product will be referred to as the boron partial ester and the second as the boron ester or boron triester.

Since the chemical structure of the above described partial ester is not known it is obvious that the structure of the further reaction product with a monohydroxy organic compound cannot be set forth. It will be referred to as the product obtained by reacting one mol of the partial ester with one mol of a monohydroxy organic compound under dehydrating conditions. Conditions under which this latter reaction take place are similar to those described for obtaining the partial ester and involve dehydration with a dehydrating agent such as concentrated sulfuric acid, concentrated phosphoric acid, $P_2O_5$ and the like, under vacuum to remove water formed during the reaction or by refluxing with a solvent such as described hereinabove which acts as an entraining agent for water produced during the reaction.

One method of preparing the intermediate product or partial ester involves the reaction of one-half mol of $B_2O_3$ with one mol of dihydroxy compound, as for example 2-ethyl hexanediol-1,3, in an ice bath at 32°–35° F. using sulfuric acid as the dehydrating agent. The reactants are stirred and brought to a temperature of about 35° F. and sulfuric acid of approximately 95% concentration is slowly added to the cooled mixture. The amount of acid to be added may vary from 0.1 to 3 volumes of acid per volume of reactants. Typically, about one volume of the acid is employed. Following the addition of sulfuric acid the reaction mixture is stirred for 20–30 minutes and then allowed to stratify. The upper layer is separated from the lower aqueous layer, consisting primarily of sulfuric acid which is discarded. The reaction product is dissolved in a solvent, as for example toluene, and preferably filtered through clay to remove traces of acid. The toluene solution is partially evaporated and the desired product crystallizes as the concentrated toluene solution is permitted to cool, the crystals being separated by filtration. Boric acid may be substituted for the $B_2O_3$, however in this case one mol of boric acid will be used per mol of polyhydroxy alcohol. Moreover, concentrated phosphoric acid or $P_2O_5$ may be used in place of the sulfuric acid.

Another method of preparing the initial reaction product or partial ester involves refluxing a mixture of one mol of boric acid or one-half mole $B_2O_3$ with one mol of dihydroxy compound, as for example 2-ethyl hexanediol-1,3, in the presence of a solvent such as naphtha or toluene. Approximately 1–4 volumes of solvent per volume of reactants will be employed. Refluxing is continued with a water trap in the reflux line until the production of water ceases. Generally this reaction will be complete in 1 to 4 or 5 hours, depending upon the reactants, and upon the reflux temperature, i.e. upon the boiling point of the solvent which is employed. When the reaction is complete, the reaction mixture may be cooled to cause the partial ester to crystallize and it is separated from the cooled mixture by filtration. In the event the solubility of the reaction product in the solvent employed warrants it, distillation without reflux will be used to remove part or all of the solvent to recover the reaction product.

Following the preparation by either method of the intermediate or partial ester, the product may be fractionally distilled at ordinary or preferably at reduced pressures to obtain a purified partial ester.

Still a third method of preparing the partial ester is to heat a mixture of boron oxide or boric acid with a dihydroxy compound in the proportion indicated hereinabove to a temperature as high as 180°–212° F. at reduced pressures, e.g. 10–20 mm. of mercury. Such heating results in the formation of the partial ester without further treatment. Heating for periods of 1 to 2 or 3 hours suffices. The resulting product may be purified by crystallizing it from a solvent such as toluene as described above and/or by fractional distillation. The partial ester boils at temperatures below the boiling point of the alcohol and is thus readily separated from unreacted alcohol when present.

This intermediate reaction product or partial ester is readily converted to the finished ester or triester, as it has been defined hereinabove, using ordinary conditions of esterification. Any of the conditions described above for preparing the partial ester may be employed. However, in this case, refluxing a mixture of one mol of partial ester with one mol of monohydroxy organic compound dissolved in naphtha or toluene with a water trap in the reflux line is a very effective method of producing the triester. Catalysts are not needed in this reaction. The reaction is complete when the production of water ceases. Approximately one mol of water is produced in the reaction. Following completion of the esterification reaction the toluene or other solvent and excess alcohol may be removed by fractional distillation.

In some instances it is found that by reacting a mixture of 1 mol of boric acid, 1 mol of dihydroxy organic compound and 1 mol of monohydroxy compound the reaction product appears to be equivalent to a corresponding compound prepared by the two step process described above. If this method of preparation is used, it is preferable to use the method involving refluxing with a solvent to effect dehydration.

The partial ester or the triester produced as described hereinabove may be added to and incorporated in silicon fluids of the type described. Since the products are readily soluble it is merely necessary to dissolve the ester in the fluid. Proportions to be used will vary between 0.1% and 5% by weight of the hydraulic fluid to be stabilized. Generally 0.5% to 2% of the boron compound will be used.

To test the E.P. and wear characteristics of the silicon hydraulic fluids containing the products of this invention use was made of the Falex tester made by the Faville-LeVally Corporation. This test machine has been used in the lubricant and related industries for more than about 20 years as a means of evaluating lubricants. Steel pins were run against steel blocks in the tests carried out and described herein and wear was determined by the number of notches the loading wheel had to be advanced in order to maintain a constant load on the jaws which compress the steel blocks against a rotating steel pin.

The following examples will serve to illustrate the invention.

*Example I*

To 400 grams of 2-methyl-pentanediol-2,4 is added 210 grams of boric acid and 100 ml. of water. This mixture is stirred and cooled in an ice bath and approximately 100 grams of 98% sulfuric acid is added dropwise with stirring. Following addition of the sulfuric acid the mixture is stirred for an additional 10 minutes and permitted to separate. The resulting upper oil-soluble phase is removed and the lower aqueous phase discarded. Upon standing, the upper phase crystallizes and is further purified by recrystallizing from a low boiling naphtha. This product is the partial ester.

Three percent by weight of this product is dissolved in a commercial ethyl silicate type hydraulic fluid. A portion of this is placed in an unstoppered pint bottle at a temperature of 60-80° F. with a relative humidity of 30-50%. After 4 weeks there is no observable clouding or deposit. A portion of the untreated fluid aged under the same condition shows the formation of a cloud after 14 days.

To 180 grams of the above product are added 90 grams of amyl alcohol dissolved in approximately 2 volumes of toluene. The resulting mixture is refluxed at a temperature of about 230° F. for a period of 2 hours with a water trap in the reflux line. At this time no further water is being collected. The reaction mixture is then distilled to remove excess amyl alcohol and the toluene. This product is the triester compound.

This product is tested in the same manner as the intermediate product above. With 2% of added boron ester there is no observable cloud formation or deposit after 4 weeks exposure.

*Example II*

A mixture of 118 grams of 2-methyl-pentanediol-2,4, 62 grams of boric acid, 100 ml. of water, and 100 ml. of methyl alcohol is heated until a uniform solution is obtained. To this mixture, at a temperature of 70° F. is added dropwise approximately 60 grams of 98% sulfuric acid with continual stirring. After the acid is added stirring is continued for 10 minutes. The mixture is allowed to stand and stratify and the upper oily layer is separated, the lower aqueous phase being discarded. On standing the oily layer crystallizes. The product is recrystallized from a naphtha whose boiling range is 160–230° F.

*Example III*

A mixture of 350 grams of $B_2O_3$ and 1180 grams of 2-methyl pentanediol-2,4, and approximately 2 volumes of ethylene dichloride is refluxed at about 1850° F. with a water trap in the reflux line for about 2 hours, at which time no more water is being recovered. At this time the solvent is removed by distillation and on cooling the product crystallizes to a solid mass. The mass is recrystallized from toluene to give what is referred to herein as the partial ester.

A mixture of 150 grams of the above product of this example and 212 grams of lauryl alcohol with 100 ml. of toluene is refluxed with a water trap in the reflux line for a period of 2 hours, at which time the production of water ceases. The toluene is then distilled leaving as a residue the triester.

Exposure tests are made in the manner described in Example I on a sample of a commercial, hexyl silicate type, hydraulic fluid, on a sample of this fluid containing 2% by weight of the partial ester described above, on another sample of the hydraulic fluid containing 1% of the triester and on still another sample of the hydraulic fluid containing 4% of the triester. In each instance where the hydraulic fluid contains the additive material no cloud or deposit is observed after 4 weeks exposure. The hexylsilicate fluid itself shows a white cloud after 2 weeks exposure.

*Example IV*

A mixture of 62 grams of boric acid, 147 grams of 2-ethyl hexanediol-1,3, and 100 ml. of a naphtha boiling in the range of 160° F. to 230° F. are refluxed with a water trap in the reflux line for about 2 hours at which time no more water is being recovered. At this time 160 grams of decanol are added and refluxing continued until no further water is being recovered. The naphtha and excess decanol are removed by distillation. The resulting triester product is a clear mobile oily liquid. This product remains a mobile liquid to −60° F.

*Example V*

A mixture of 119 grams hexanediol and 62 grams of boric acid are heated together under a slight vacuum with a water trap in the vacuum line for about 2 hours at which time complete solution is accomplished and no more water is being recovered. At this time 100 grams of cyclohexanol are added and heating is continued under a slight vacuum for about 2 hours at which time no further water is being obtained. The triester product is a mobile liquid which remains fluid to −60° F.

*Example VI*

A mixture of 146 grams of 2-ethyl-hexanediol-1,3, 62 grams of boric acid, and 200 ml. of toluene are refluxed with a water trap in the line for 1 hour at which time no further water is being recovered. At this time 103 grams of tetrahydrofurfuryl alcohol are added and refluxing continued for about 1 hour at which time no further water is being recovered. The toluene was removed by distillation. A clear mobile liquid is obtained which remains fluid at −60° F.

Example VII

A mixture of 146 grams of 2-ethyl hexanediol-1,3, 62 grams of boric acid and 100 ml. of toluene are refluxed with a water trap in the reflux line for about 2 hours at which time no further water is being recovered. A portion of the product in toluene solution is removed and separately handled to recover the partial ester. This is accomplished by evaporating toluene leaving the partial ester as residue.

The remainder of the toluene solution above described is further refluxed after adding 1 mol of cetyl alcohol per mol of partial ester. Following completion of the reaction the toluene solution is cooled and the triester product separates as well defined crystals which are removed by filtration. This material is the triester.

Each of the above products are dissolved in samples of a commercial dimethyl polysiloxane hydraulic fluid having a viscosity at 25° C. of 350 centistokes to give products containing 2% by weight of the additive. In the exposure test described in Example I these samples remain free from cloud and deposits after 4 weeks. The hydraulic fluid without additives shows a cloud after 2 weeks exposure.

In the Falex test the above hydraulic fluid without additives permits seizure within 2 minutes with a jaw load of 400 pounds. The same fluid to which 5% by weight of the triester is added does not seize at 800 pounds but with a 1000 pound jaw load permits seizure within 2 minutes at a jaw load of 400 pounds. The fluid containing 5% of the triester shows 10 notches wear after 120 minutes operation.

Similar Falex test results are obtained when the partial ester is added to the above hydraulic fluid in similar proportions.

Example VIII

A mixture of 62 grams of boric acid, 98 grams of resorcinol and 200 ml. of benzene are refluxed with a water trap in the reflux line for about 3 hours at which time no more water is being recovered. At this time 95 grams of phenol are added and refluxing continued for about 1 hour. The benzene was removed by distillation.

Example IX

A mixture of 35 grams $B_2O_3$, 98 grams of resorcinol, and 100 ml. of toluene are refluxed with a water trap in the reflux line for about 2 hours at which time no further water is being recovered. One-half of the product is removed and the toluene evaporated leaving the partial ester as a residue.

To the remainder of the original reaction mixture is added 50 grams of cyclohexanol and refluxing continued for an additional hour. The toluene is evaporated from this product leaving the triester as a residue.

Exposure tests described in Example I show that when 2% by weight of the triester or of the partial ester are added to the hexylsilicate type hydraulic fluid the inhibited products do not show cloud formation or form deposits after 4 week periods of exposure.

Falex tests on the hexylsilicate with and without added triester show that the fluid itself seizes at about 2 minutes with a jaw loading of 300 pounds whereas the fluid containing 2% of the partial ester or the triester operates for 120 minutes at a jaw load of 300 pounds with wear equivalent to 11 notches and 10 notches respectively.

The above description and examples of this invention are illustrative of the invention but are not to be construed as limiting the broader aspects of this invention.

I claim:

1. A hydraulic fluid consisting of a fluid silicon compound selected from the class consisting of dimethyl polysiloxanes, alkyl silicates and polyalkyl silicates containing 0.1% to about 5% by weight of the product obtained by reacting under dehydrating conditions 1 mol of a dihydroxy hydrocarbon compound containing about 6 to about 30 carbon atoms per molecule in which the hydroxyl groups are attached to carbon atoms separated by at least 1 but not more than 2 carbon atoms with an amount of a boron compound selected from the class consisting of boric acid and boron oxide equivalent to 1 mol of boric acid and further reacting under dehydrating conditions the product so obtained with 1 mol of a monohydroxy organic compound having 1 to 26 carbon atoms per molecule.

2. A hydraulic fluid according to claim 1 in which said fluid silicon compound is a dimethyl polysiloxane having a viscosity at 25° C. of about 350 centistokes.

3. A hydraulic fluid according to claim 1 in which said dihydroxy hydrocarbon compound is an aliphatic dihydroxy alcohol containing between about 6 and about 18 carbon atoms.

4. A hydraulic fluid according to claim 3 in which said aliphatic dihydroxy alcohol is 2-methyl pentanediol-2,4.

5. A hydraulic fluid consisting of a fluid silicon compound selected from the class consisting of dimethyl polysiloxanes, alkyl silicates and polyalkyl silicates containing 0.1% to about 5% by weight of the product obtained by reacting under dehydrating conditions 1 mol of a dihydroxy hydrocarbon compound containing about 6 to about 18 carbon atoms per molecule in which the hydroxyl groups are attached to carbon atoms separated by 1 carbon atom with an amount of a boron compound selected from the class consisting of boric acid and boron oxide equivalent to 1 mol of boric acid, and further reacting under dehydrating conditions the product so obtained with 1 mol of a monohydroxy aliphatic alcohol having 1 to 20 carbon atoms per molecule.

6. A hydraulic fluid consisting essentially of a fluid silicon compound selected from the class consisting of dimethyl polysiloxanes, alkyl silicates and polyalkyl silicates containing 0.1% to about 5% by weight of the product obtained by reacting under dehydrating conditions 1 mol of a dihydroxy hydrocarbon compound containing about 6 to about 30 carbon atoms per molecule in which the hydroxyl groups are attached to carbon atoms separated by at least 1 but not more than 2 carbon atoms and 1 mol of a monohydroxy organic compound having 1 to 26 carbon atoms per molecule with an amount of a boron compound selected from the class consisting of boric acid and boron oxide equivalent to 1 mol of boric acid.

References Cited in the file of this patent

UNITED STATES PATENTS

| | | |
|---|---|---|
| 2,371,068 | Rochow | Mar. 6, 1945 |
| 2,398,187 | McGregor et al. | Apr. 9, 1945 |
| 2,642,453 | Lippincott | June 16, 1953 |
| 2,721,180 | Lawrence et al. | Oct. 18, 1955 |
| 2,751,355 | Clark | June 19, 1956 |
| 2,755,296 | Kirkpatrick | July 17, 1956 |
| 2,795,548 | Thomas et al. | June 11, 1957 |
| 2,813,830 | Trautman | Nov. 19, 1957 |

FOREIGN PATENTS

| | | |
|---|---|---|
| 151,326 | Australia | Apr. 26, 1951 |
| 1,070,757 | France | Feb. 24, 1954 |